(12) United States Patent
Mine et al.

(10) Patent No.: US 12,367,710 B2
(45) Date of Patent: Jul. 22, 2025

(54) LINE-OF-SIGHT DETECTION DEVICE AND CONTROL METHOD FOR CONTROLLING THE SAME

(71) Applicant: CANON KABUSHIKI KAISHA, Tokyo (JP)

(72) Inventors: Yosuke Mine, Tokyo (JP); Takashi Ichimiya, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 571 days.

(21) Appl. No.: 17/678,622

(22) Filed: Feb. 23, 2022

(65) Prior Publication Data

US 2022/0277590 A1    Sep. 1, 2022

(30) Foreign Application Priority Data

Feb. 26, 2021    (JP) ................................. 2021-030209

(51) Int. Cl.
| | |
|---|---|
| *G06T 7/11* | (2017.01) |
| *G06T 7/64* | (2017.01) |
| *G06T 7/70* | (2017.01) |
| *G06V 40/18* | (2022.01) |
| *G06V 40/19* | (2022.01) |
| *H04N 23/611* | (2023.01) |
| *H04N 23/63* | (2023.01) |

(52) U.S. Cl.
CPC ............. *G06V 40/193* (2022.01); *G06T 7/11* (2017.01); *G06T 7/64* (2017.01); *G06T 7/70* (2017.01); *G06V 40/19* (2022.01); *H04N 23/611* (2023.01); *H04N 23/63* (2023.01); *G06T 2207/20021* (2013.01)

(58) Field of Classification Search
CPC .... G06V 40/193; G06V 40/19; G06V 40/197; G06T 7/11; G06T 7/64; G06T 7/70; G06T 2207/20021; H04N 23/611; H04N 23/63; A61B 3/113; G01B 11/002
See application file for complete search history.

(56) References Cited

U.S. PATENT DOCUMENTS

| | | | |
|---|---|---|---|
| 10,417,495 | B1 | 9/2019 | Davami |
| 2010/0054548 | A1 | 3/2010 | Inada |
| 2016/0026863 | A1 | 1/2016 | Hakoshima |
| 2017/0286771 | A1* | 10/2017 | Ishii ........................ A61B 3/113 |
| 2018/0144179 | A1 | 5/2018 | Hatakeyama et al. |

FOREIGN PATENT DOCUMENTS

| | | |
|---|---|---|
| JP | S61172552 A | 8/1986 |
| JP | H04347132 A | 12/1992 |
| JP | 3143490 B2 | 3/2001 |
| KR | 20160061691 A | 6/2016 |

* cited by examiner

*Primary Examiner* — Marcos L Torres
(74) *Attorney, Agent, or Firm* — Canon U.S.A., Inc., Division

(57) ABSTRACT

Line-of-sight detection taking into account the shape of the pupil is performed. A central processing unit (CPU) detects a group of contour coordinates of the pupil from an eyeball image obtained as a result of capturing an image of the eyeball of an observer and performs control to perform line-of-sight detection taking into account the shape of the pupil.

4 Claims, 14 Drawing Sheets

LINE-OF-SIGHT DETECTION DEVICE AND CONTROL METHOD FOR CONTROLLING THE SAME

BACKGROUND OF THE INVENTION

Field of the Invention

The present invention relates to an optical apparatus including a line-of-sight detection unit.

Description of the Related Art

Conventionally, a so-called line-of-sight detection device is discussed that detects which position on an observation surface an observer of an optical apparatus observes.

For example, in Japanese Patent Application Laid-Open No. 61-172552, a parallel light beam from a light source is projected onto an anterior eye portion of the eyeball of an observer, and a visual axis is obtained using a cornea reflection image of light reflected from the cornea and an image forming position of the pupil.

Japanese Patent No. 3143490 discusses a method for estimating the pupil circle based on the coordinates of the horizontal/vertical positions of output signals considered as related to the pupil edge extracted by an area sensor, and applying the center coordinates of the pupil circle to line-of-sight detection. This method estimates a circle at many observation points, and therefore can excellently estimate the original circle even at observation points along a semicircle or a crescent circle, for example.

Japanese Patent Application Laid-Open No. 61-172552 and Japanese Patent No. 3143490 are effective in a case where the pupil has a true circle shape without loss, but do not consider a case where the pupil shape is an ellipse, or a case where a part of the contour of the pupil is lost. Thus, an error may occur in the detection result of the pupil center, and the detection accuracy of the line of sight may decrease.

SUMMARY OF THE INVENTION

The present invention is directed to providing a line-of-sight detection device that enables line-of-sight detection taking into account the shape of the pupil, and a control method for controlling the same.

According to an aspect of the present invention, an image capturing unit configured to capture an image of an eyeball of an observer, a contour detection unit configured to detect a group of contour coordinates of a pupil from the image of the eyeball acquired from the image capturing unit, a calculation unit configured to calculate a pupil center position from the group of contour coordinates, and a line-of-sight detection unit configured to detect a line of sight of the observer from the pupil center position are included, and the calculation unit is configured to calculate a pupil center position from a second group of contour coordinates obtained by excluding some coordinates from a first group of contour coordinates detected by the detection unit, and the line-of-sight detection unit is configured to detect the line of sight of the observer based on the pupil center position.

According to another aspect of the present invention, an image capturing unit configured to capture an image of an eyeball of an observer, a contour detection unit configured to detect a group of contour coordinates of a pupil from the image of the eyeball acquired from the image capturing unit, a calculation unit configured to calculate a pupil center position from the group of contour coordinates, and a unit configured to detect a line of sight of the observer from the pupil center position are included, and the calculation unit is configured to calculate a pupil center position based on the group of contour coordinates and information regarding a pupil shape stored in advance.

According to yet another aspect of the present invention, an image capturing unit configured to capture an image of an eyeball of an observer, a unit configured to detect a group of contour coordinates of a pupil from the image of the eyeball acquired from the image capturing unit, a first calculation unit configured to calculate a first pupil center position from the group of contour coordinates by true circular approximation, a second calculation unit configured to calculate a second pupil center position from the group of contour coordinates by elliptical approximation, and a line-of-sight detection unit configured to detect a line of sight of the observer from a pupil center position to be used according to a determination of a determining unit are included, and it is configured to, according to loss of a contour of the pupil, change whether to use the first pupil center position or the second pupil center position to detect the line of sight of the observer detected by the line-of-sight detection unit.

Further features of the present invention will become apparent from the following description of embodiments with reference to the attached drawings.

DESCRIPTION OF THE EMBODIMENTS

Embodiments of the present invention will be described in detail below based on the attached drawings. Each of the embodiments of the present invention described below can be implemented solely or as a combination of a plurality of the embodiments or features thereof where necessary or where the combination of elements or features from individual embodiments in a single embodiment is beneficial.

Figure 1:
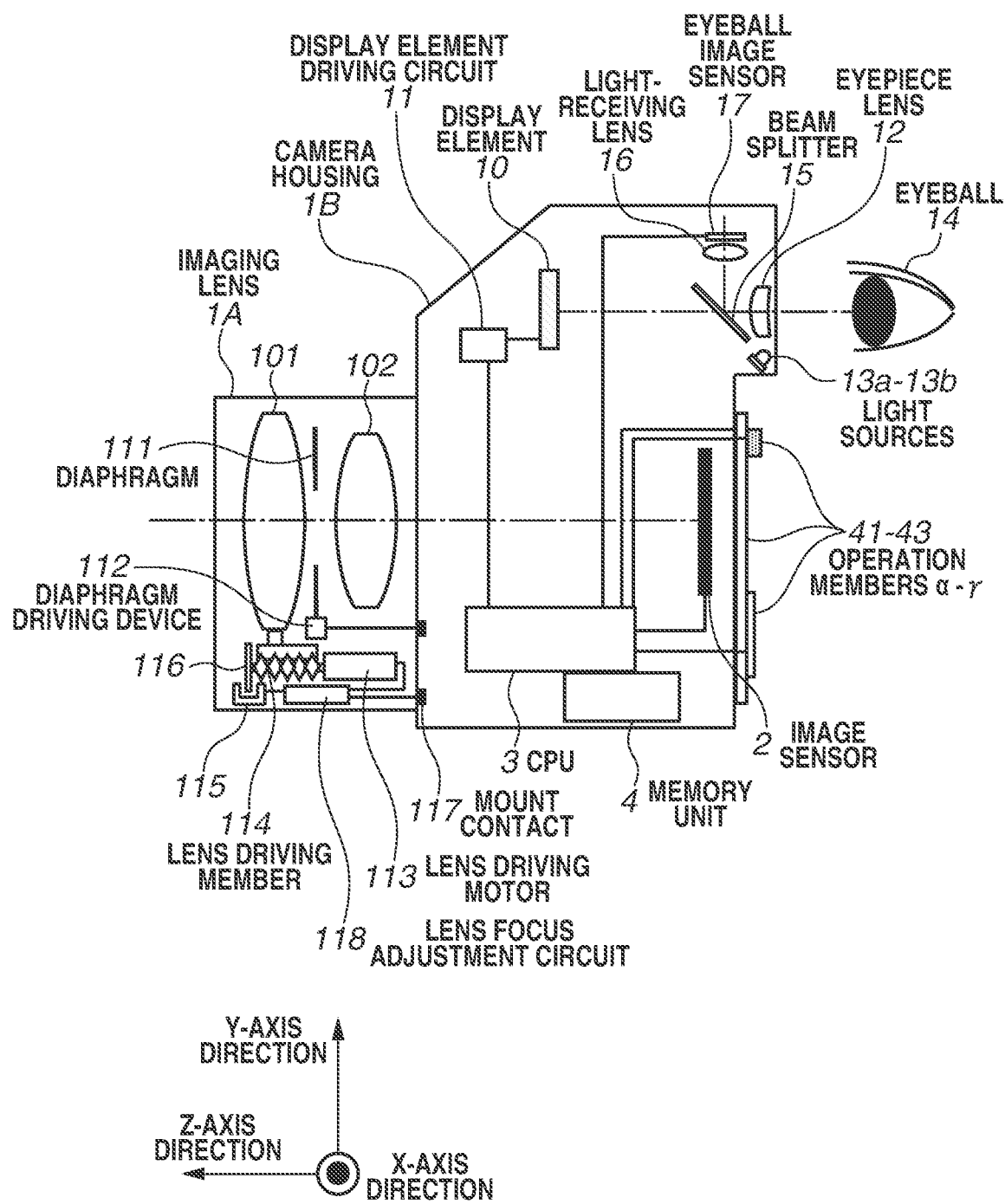
FIG. 1 is an external schematic view of an imaging apparatus according to an embodiment of the present invention.

A first embodiment of the present invention will be described. FIG. 1 is a cross-sectional view of a housing of a camera and is a diagram illustrating the outline of the configuration of a digital still camera 1 in which a line-of-sight detection unit according to the first embodiment of the present invention is provided.

FIG. 1 illustrates an imaging lens 1A in an interchangeable lens camera. Although the inside of the imaging lens 1A is represented by two lenses 101 and 102 for convenience in the first embodiment, it is known that the imaging lens 1A actually includes more lenses. FIG. 1 illustrates a housing portion 1B of the camera main body. The configuration of units included in the housing portion 1B is as follows. An image sensor 2 is placed on an image forming plane of the imaging lens 1A of the digital still camera 1. The digital still camera 1 includes a central processing unit (CPU) 3 that controls the entirety of the camera 1, and a memory unit 4 that records an image captured by the image sensor 2. In the digital still camera 1, a display element 10 including liquid crystals for displaying a captured image, a display element driving circuit 11 that drives the display element 10, and an eyepiece lens 12 for observing an object image displayed on the display element 10 are also placed.

Light sources 13a and 13b illuminate an eyeball 14 of a photographer to detect a line-of-sight direction based on the relationships between reflection images obtained by the cornea reflecting light from light sources used in a single-lens reflex camera and the pupil. The light sources 13a and 13b are composed of infrared light-emitting diodes and placed near the eyepiece lens 12. An eyeball image of the illuminated eyeball 14 and images obtained by the cornea reflecting light from the light sources 13a and 13b pass through the eyepiece lens 12 and are reflected by a beam splitter 15. Then, a light-receiving lens 16 forms the images on an eyeball image sensor 17 in which columns of photoelectric elements such as complementary metal-oxide-semiconductors (CMOSs) are two-dimensionally disposed. The light-receiving lens 16 positions the pupil of the eyeball 14 of the photographer and the eyeball image sensor 17 in a conjugate image forming relationship. Based on the positional relationships between the image of the eyeball 14 and the images obtained by the cornea reflecting light from the light sources 13a and 13b that are formed on the eyeball image sensor 17, a line-of-sight direction is detected by a predetermined algorithm.

In the imaging lens 1A, a diaphragm 111, a diaphragm driving device 112, a lens driving motor 113, and a lens driving member 114 composed of a driving gear are provided. A photocoupler 115 detects the rotation of a pulse plate 116 interlocked with the lens driving member 114 and transmits the detected rotation to a lens focus adjustment circuit 118. The focus adjustment circuit 118 drives the lens driving motor 113 by a predetermined amount based on information regarding the detected rotation and information regarding the driving amount of the lens 1A from the camera 1, thereby moving the imaging lens 1A to an in-focus position. A mount contact 117 is an interface between a known camera and a known lens.

Alternatively, a configuration may be employed in which an image of the illuminated eyeball 14 is directly captured by the eyeball image sensor 17 and the light-receiving lens 16 not via the eyepiece lens 12 and the beam splitter 15. In this case, the acquired image may be optically corrected by an amount corresponding to the placement of the eyeball image sensor 17 and the light-receiving lens 16 at positions that do not interfere with the display element 10.

Figure 2:
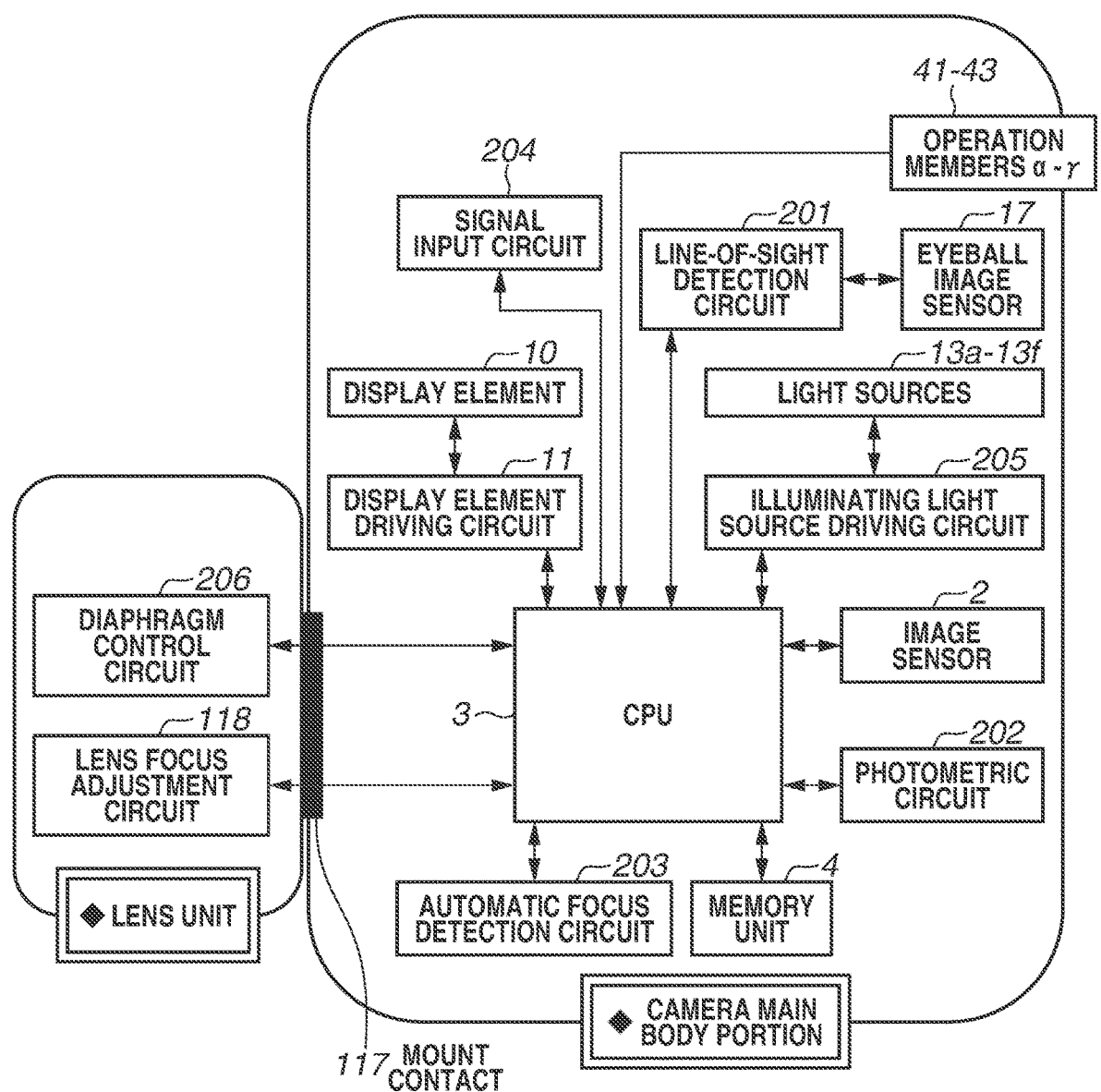
FIG. 2 is a block diagram of the imaging apparatus according to an embodiment of the present invention.

FIG. 2 is a block diagram illustrating an electrical configuration built into the digital still camera 1 having the above configuration, and components that are the same as those in FIG. 1 are designated by the same numbers. To the CPU 3 that is a microcomputer built into the camera main body, a line-of-sight detection circuit 201, a photometric circuit 202, an automatic focus detection circuit 203, a signal input circuit 204, the display element driving circuit 11, and an illuminating light source driving circuit 205 are connected. The CPU 3 communicates signals with the focus adjustment circuit 118 placed in the imaging lens 1A and a diaphragm control circuit 206 included in the diaphragm driving device 112 via the mount contact 117 illustrated in FIG. 1. The memory unit 4 attached to the CPU 3 has a storage function for storing imaging signals from the image sensor 2 and the eyeball image sensor 17, and a storage function for storing line-of-sight correction data for correcting the individual difference in the line of sight.

The line-of-sight detection circuit 201 performs analog-to-digital (A/D) conversion on an output obtained by forming an eyeball image from the eyeball image sensor 17 and transmits information regarding the image to the CPU 3. The CPU 3 extracts feature points of the eyeball image for line-of-sight detection according to a predetermined algorithm and further calculates the line of sight of the photographer from the positions of the feature points.

Based on a signal obtained from the image sensor 2 that functions also as a photometric sensor, the photometric circuit 202 amplifies a luminance signal output corresponding to the brightness of an object field, then performs logarithmic compression and A/D conversion on the luminance signal output, and sends the luminance signal output as object field luminance information to the CPU 3.

The automatic focus detection circuit 203 performs A/D conversion on signal voltages from a plurality of pixels included in CMOSs of the image sensor 2 and used for phase difference detection and sends the signal voltages to the CPU 3. From signals of the plurality of pixels, the CPU 3 calculates the distance to an object corresponding to focus detection points. This is a technique known as phase difference autofocus (AF).

To the signal input circuit 204, a switch SW1 is connected that is turned on by making a first stroke on a shutter release button (not illustrated) and starts a photometric operation, a distance measurement operation, or a line-of-sight detection operation of the camera 1. To the signal input circuit 204, a switch SW2 is also connected that is turned on by making a second stroke on the shutter release button and starts a shutter release operation. The above signals are input to the signal input circuit 204 and transmitted to the CPU 3.

<Optical System for Performing Line-of-Sight Detection>

Figure 3:
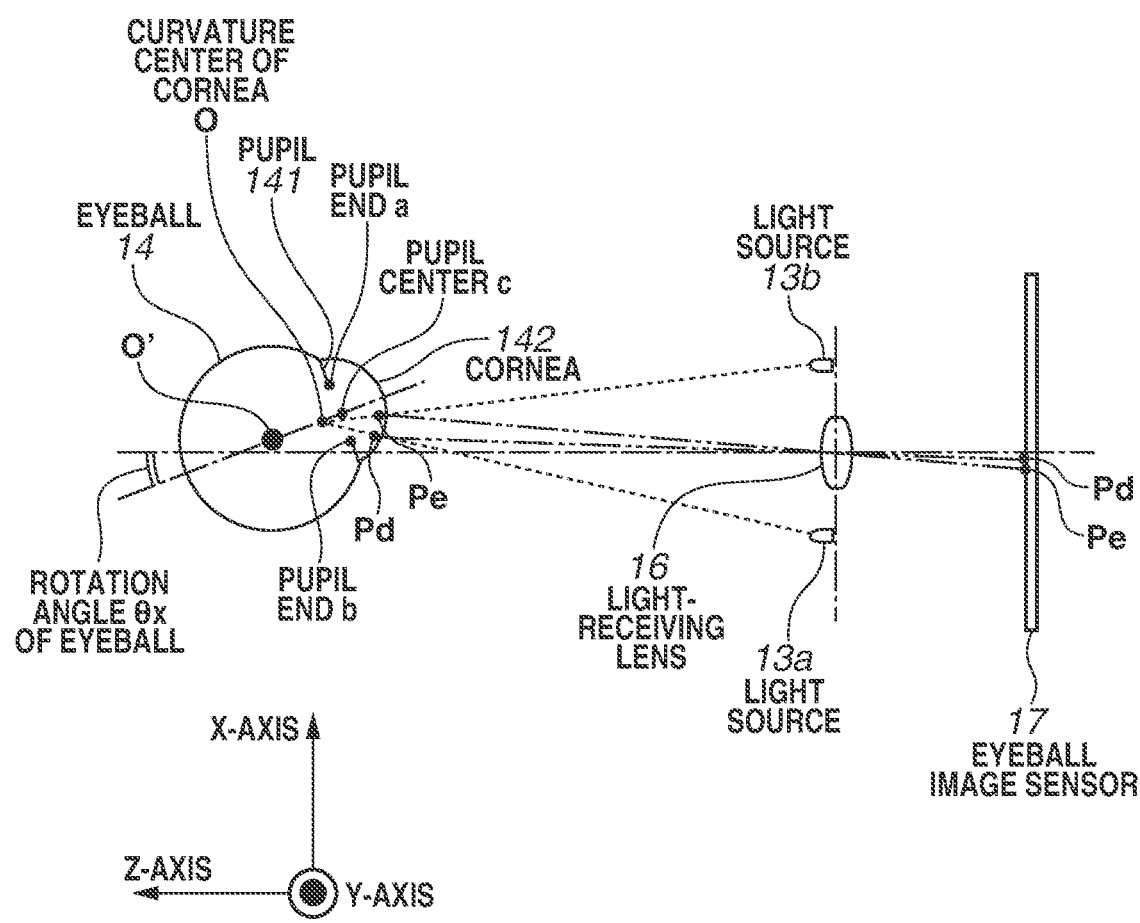
FIG. 3 is a diagram illustrating a field of view in a viewfinder according to an embodiment of the present invention.

FIG. 3 is a diagram illustrating the principle of a line-of-sight detection method and is equivalent to an overview diagram of an optical system for performing line-of-sight detection in FIG. 1.

In FIG. 3, the light sources 13a and 13b are light sources such as light-emitting diodes that emit invisible infrared light to the photographer as an observer. The light sources 13a and 13b are placed approximately symmetrically with respect to the optical axis of the light-receiving lens 16 and illuminate the eyeball 14 of the observer. A part of the illuminating light reflected by the eyeball 14 is collected by the light-receiving lens 16.

<Principle of Line-of-Sight Detection Operation>

Figure 4A:
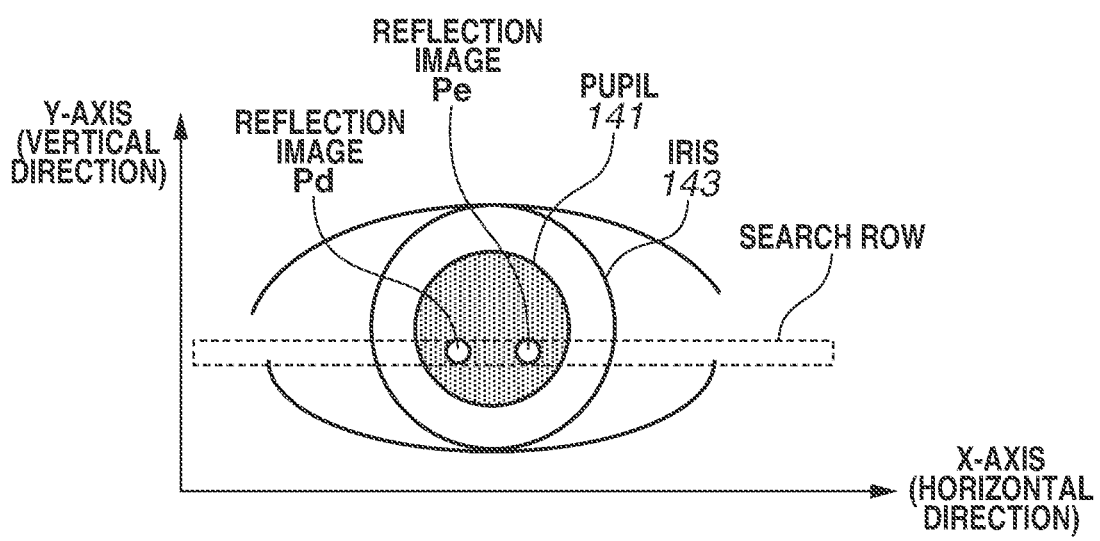
FIG. 4A is a schematic diagram of an eyeball image projected onto an eyeball image sensor.
Figure 4B:
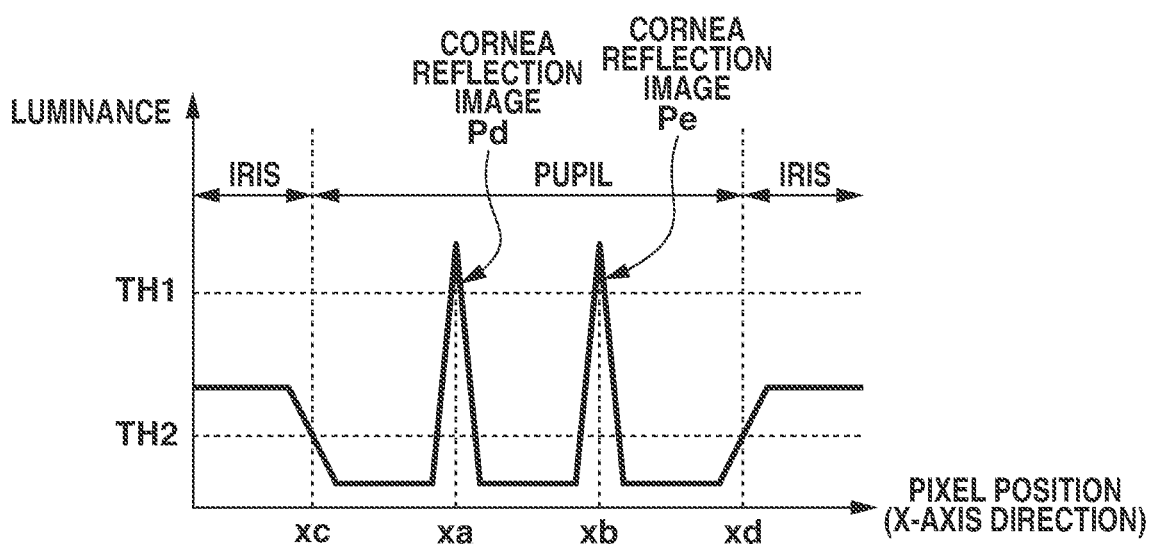
FIG. 4B is a diagram illustrating luminance distribution of the eyeball image.

Next, with reference to FIGS. 4A and 4B, the principle of a line-of-sight detection operation is described.

FIG. 4A is a diagram illustrating an eyeball image obtained from the eyeball image sensor 17. From the inside of the eyeball image, cornea reflection images Pd and Pe of light from the light sources 13a and 13b and a pupil center c are detected, and a rotation angle θ of the eyeball 14 can be calculated from the cornea reflection images Pd and Pe and the pupil center c. Next, based on the rotation angle θ and calibration data, the line-of-sight position of the observer on the display element 10 is obtained.

First, a method for detecting the cornea reflection images Pd and Pe is described.

In FIG. 4A, a horizontal direction is an X-axis, and a vertical direction is a Y-axis. At this time, the coordinates of the positions where the cornea reflection images Pd and Pe of light from the light sources 13a and 13b are formed are coordinates (Xa, Ya) and coordinates (Xb, Yb), respectively.

FIG. 4B is a diagram illustrating luminance information regarding any single row (hereinafter referred to as a "search row") of the eyeball image in FIG. 4A.

In the luminance information in FIG. 4B, at the positions where the cornea reflection images Pd and Pe of light from the light sources 13a and 13b are formed, luminances at extremely high levels greater than or equal to a luminance threshold TH2 are obtained. The search row is changed, and the process of determining the levels of the luminances is sequentially performed, thereby detecting coordinates where the luminances are greater than or equal to the threshold TH2 in the entirety of the eyeball image, and calculating the centers of gravity of the coordinates. This can detect the coordinates (Xa, Ya) of the cornea reflection image Pd and the coordinates (Xb, Yb) of the cornea reflection image Pe.

<Detection Method for Detecting Pupil Center Position>

Next, a method for detecting the pupil center c of a pupil 141 is described.

In the luminance information in FIG. 4B, the coordinates of pupil contour portions are (Xc, Yc) and (Xd, Yd). In the region of the pupil 141, luminances at low levels less than or equal to a luminance threshold TH1 are obtained except at the positions of the coordinates (Xa, Ya) and (Xb, Yb). In contrast, in portions corresponding to the region of an iris 143 outside the pupil 141, luminances at relatively high levels between the luminance thresholds TH1 and TH2 are obtained. That is, portions having the pixel coordinates (Xc, Yc) and (Xd, Yd) where the luminances change at or below the luminance threshold TH2 and are at luminance levels that are the same as the luminance threshold TH1 are determined as the pupil contour portions. The search row and the search column are changed, and the process of determining the levels of the luminances is sequentially performed. This can detect the coordinates of the pupil contour in the entirety of the eyeball image. A plurality of pairs of contour coordinates of the pupil is also referred to as a "group of contour coordinates of the pupil". The detection of the contour coordinates of the pupil is also referred to as "contour detection".

By a true circular approximation method using the contour coordinates of the pupil, center coordinates c and a radius r of the pupil 141 are calculated.

If there are 20 pairs of first contour coordinates, and the first contour coordinates are represented by contour coordinates (Xi, Yi) where i=1 to 20, coordinates (X0, Y0) of the center c and the radius r of the pupil 141 are calculated by the following formula.

$$\begin{pmatrix} \alpha \\ \beta \\ \gamma \end{pmatrix} = \begin{pmatrix} \sum Xi^2 & \sum XiY_i & \sum Xi \\ \sum XiY_i & \sum Yi^2 & \sum Yi \\ \sum Xi & \sum Yi & \sum 1 \end{pmatrix}^{-1} \begin{pmatrix} -\sum(Xi^3 + XiY_i^2) \\ -\sum(Xi^2 Y_i + Y_i^3) \\ -\sum(Xi^2 + Y_i^2) \end{pmatrix}$$

$$X_0 = -\frac{\alpha}{2}$$

$$Y_0 = -\frac{\beta}{2}$$

$$r = \sqrt{X_0^2 + Y_0^2 - \gamma}$$

Next, an image forming magnification β of the eyeball image is calculated. The magnification β is determined based on the position of the eyeball 14 relative to the light-receiving lens 16, and can be substantially obtained as a function of the distance between the cornea reflection images Pd and Pe.

The coordinates of the midpoint between the cornea reflection images Pd and Pe and the coordinates of a curvature center O of a cornea 142 almost match each other. Thus, if a standard distance between the curvature center O of the cornea 142 and the center c of the pupil 141 is Oc, a rotation angle θx in a Z-X plane of the optical axis of the eyeball 14 can be obtained by the following formula.

β*Oc*SIN θx≈{(Xa+Xb)/2}−X0

FIG. 3 illustrates an example where the rotation angle θx in a case where the eyeball 14 of the photographer rotates in a plane perpendicular to the Y-axis is calculated. A rotation angle θy in a case where the eyeball 14 of the photographer rotates in a plane perpendicular to the X-axis can be obtained by the following formula.

β*Oc*SIN θy≈{(Ya+Yb)/2}−Y0

Using the calculated rotation angles θx and θy, the position of the line of sight of the observer on the display element 10 is obtained. If a point-of-gaze position has coordinates (Hx, Hy) corresponding to the center c of the pupil 141 on the display element 10, the coordinates (Hx, Hy) can be calculated by Hx=m×(θx−θx_cal)

Hy=m×(θy−θy_cal)

At this time, a coefficient m is a constant determined by the configuration of the viewfinder optical system of the camera and is a conversion coefficient that converts the rotation angles θx and θy into positional coordinates corresponding to the center c of the pupil 141 on the display element 10. The coefficient m is determined in advance and stored in the memory unit 4. θx_cal and θy_cal are rotation angles calculated when a calibration operation is performed, and are stored in the memory unit 4 before a line-of-sight detection routine starts.

The calibration operation is an operation for storing offset amounts for reducing a positional shift between the position at which a user actually gazes and a calculated estimated point of gaze due to the individual difference in the shape of a human eyeball.

When the calibration operation is performed, a calibration image is displayed on the display element 10. The image is a target frame at which the photographer is to gaze, and is displayed in a center portion of the display element 10. The rotation angles θx_cal and θy_cal at this time are acquired and stored as offset amounts in the memory unit 4.

The accuracy of the calibration can be improved by displaying the target frame at a plurality of positions and interpolating the plurality of positions by the rotation angles at the plurality of positions.

This is the description of the principle of the line-of-sight detection operation.

Figure 5:
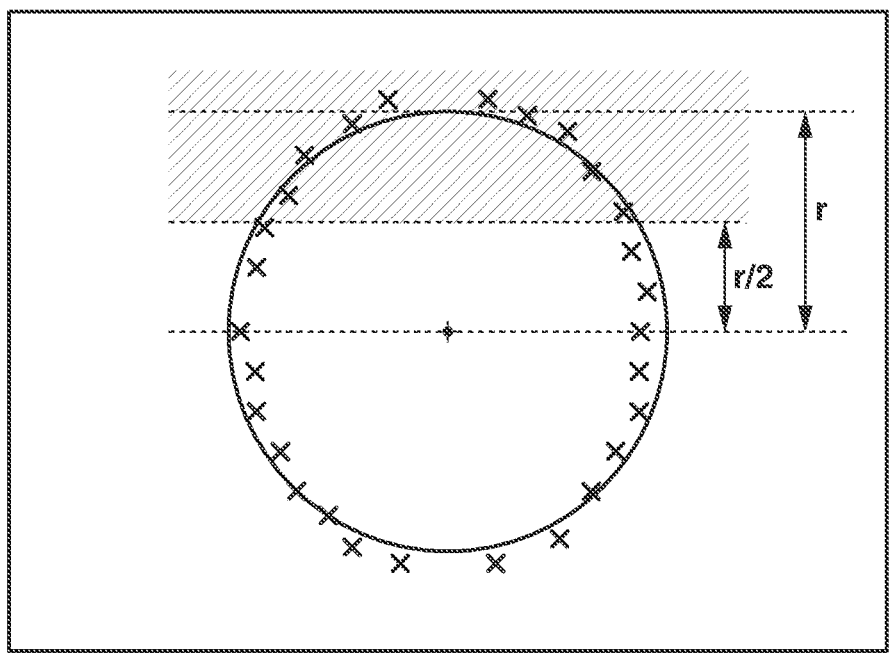
FIG. 5 is a diagram illustrating an example of an exclusion range of contour candidates according to a first embodiment of the present invention.
Figure 6:
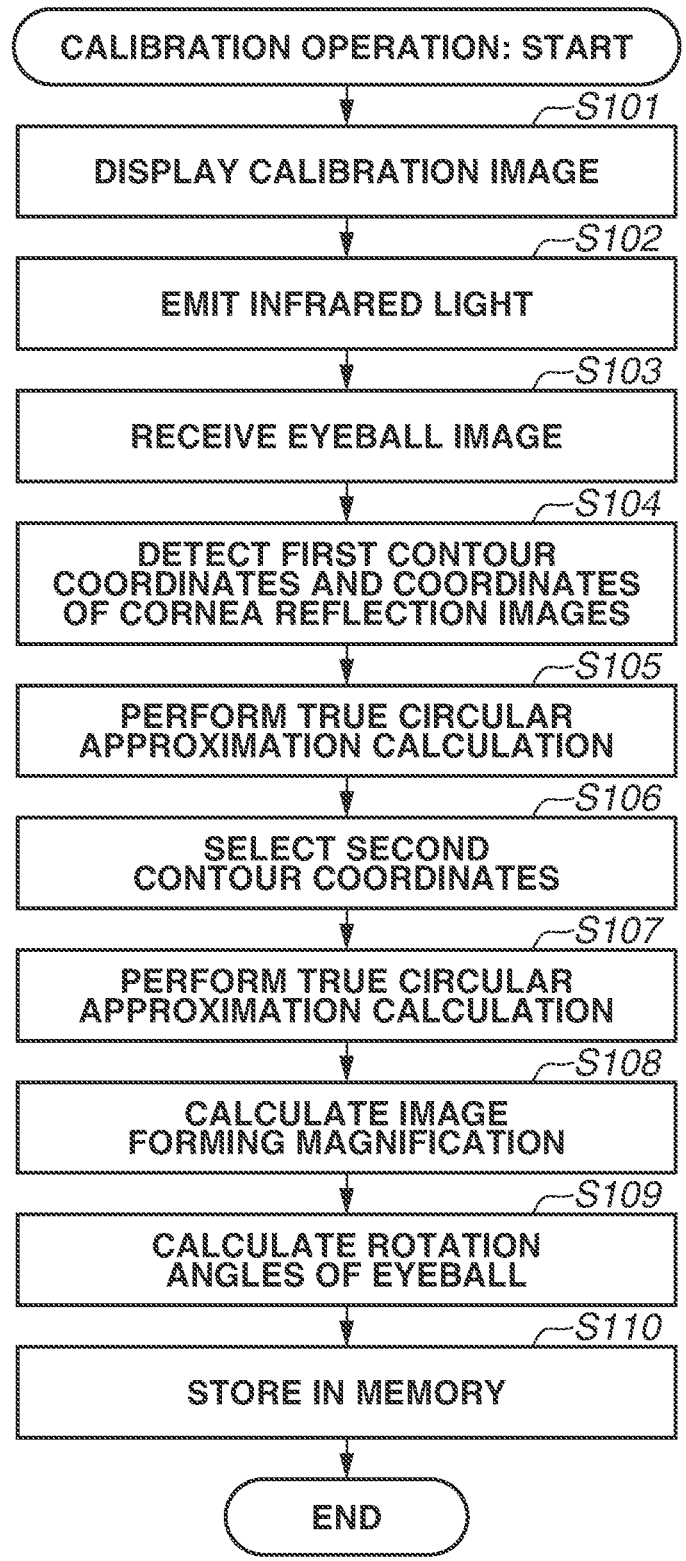
FIG. 6 is a flowchart of a calibration operation for line-of-sight detection according to the first embodiment of the present invention.
Figure 7:
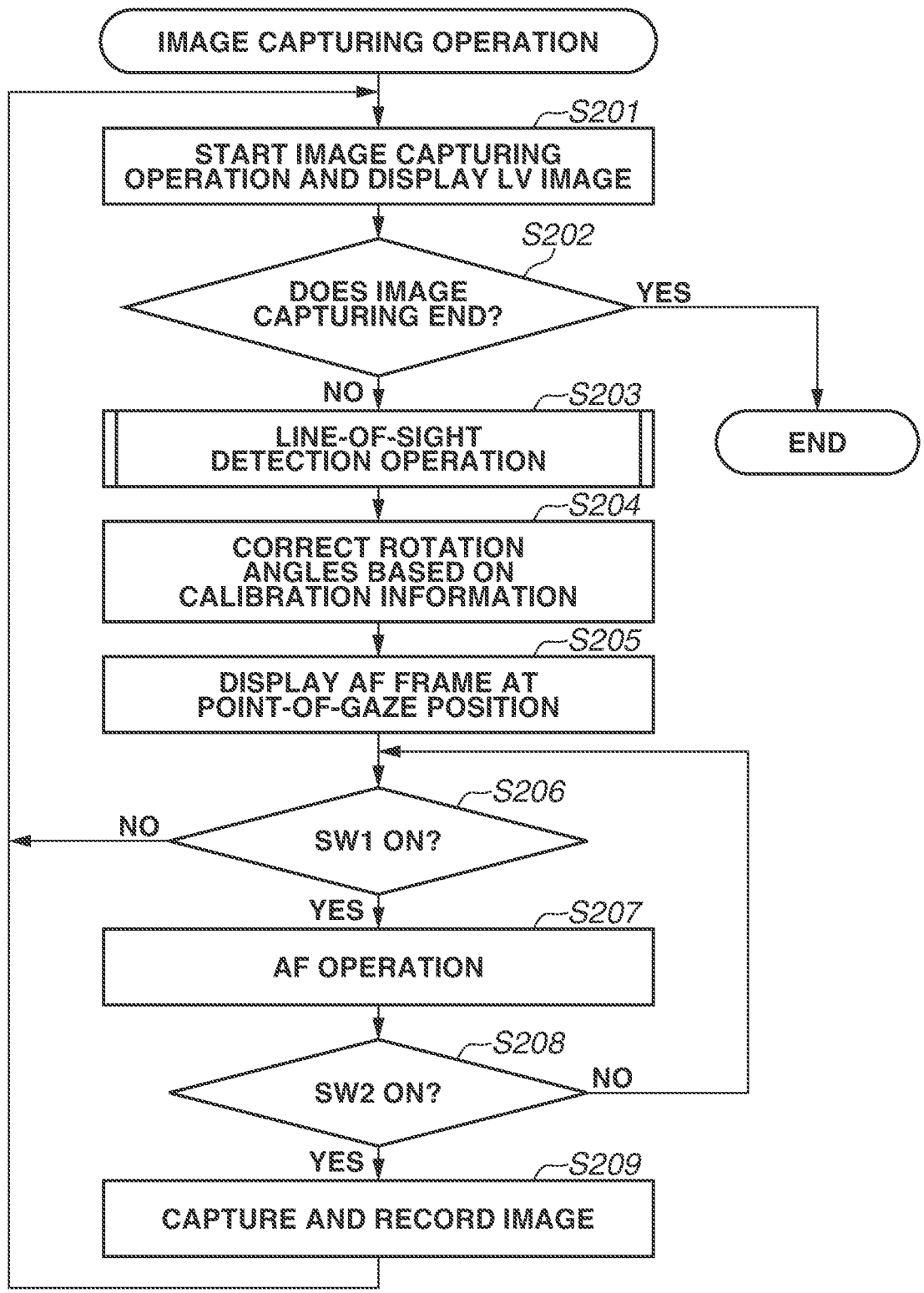
FIG. 7 is a flowchart of an image capturing operation according to the first embodiment of the present invention.

With reference to FIGS. 5 to 7, the line-of-sight detection operation according to the first embodiment is described.

<Line-of-Sight Detection Operation when Calibration is Performed>

FIG. 6 is a flowchart illustrating the calibration operation for line-of-sight detection. The operation of this flowchart is executed by control of the CPU 3.

In step S101, a calibration image is displayed on the display element 10.

In step S102, the light sources 13a and 13b emit infrared light to the eyeball 14 of the observer. An eyeball image of the eyeball 14 illuminated by the infrared light is formed on the eyeball image sensor 17 through the light-receiving lens 16 and subjected to photoelectric conversion by the eyeball image sensor 17, and the eyeball image can be processed as an electric signal.

In step S103, the CPU 3 receives the eyeball image signal obtained by the eyeball image sensor 17.

In step S104, based on information regarding the eyeball image signal obtained by the operation of step S103, the coordinates of the cornea reflection images Pd and Pe of light from the light sources 13a and 13b illustrated in FIG. 3 and the first contour coordinates are obtained.

In step S105, by the true circular approximation method, the center coordinates c and the radius r of the pupil 141 are calculated using the contour coordinates of the pupil 141 obtained by the operation of step S104 as the first contour coordinates.

In step S106, second contour coordinates are selected from information regarding "the first contour coordinates" and "the center coordinates c and the radius r calculated from the first contour coordinates".

In an upper portion of the pupil 141, it is highly likely that contour information is lost due to the eyelid. In response, among the obtained contour coordinates, contour coordinates in the upper portion are removed in advance, whereby it is possible to reduce an error in the center coordinates based on the presence or absence of loss.

FIG. 5 is a diagram illustrating an example of the selection range of contour coordinates.

Coordinates included in a shaded region above r/2 in the Y-axis direction from the center coordinates are excluded, and coordinates other than those in the shaded region are selected as the second contour coordinates. In this example, the exclusion range is limited to the region above r/2, but may be changed according to the size or the image forming position.

In step S107, by the true circular approximation method, center coordinates c' and a radius r' of the pupil 141 are calculated from the second contour coordinates selected in step S106.

In step S108, the image forming magnification β of the eyeball image is calculated.

In step S109, the rotation angles θx and θy in the Z-X plane of the optical axis of the eyeball 14 are calculated.

In step S110, the rotation angles θx and θy calculated by the operation of step S109 are stored as the corrected values θx_cal and θy_cal in the memory unit 4.

<Image Capturing Operation>

After the calibration operation for line-of-sight detection described in FIG. 6, an image capturing operation is performed.

FIG. 7 is a flowchart illustrating the image capturing operation of the camera 1 having a line-of-sight detection function. The operation of this flowchart is executed by control of the CPU 3.

If the camera 1 is powered on and the flow is started, then in step S201, the image sensor 2 is driven, and the acquisition of an image is started. The CPU 3 displays the acquired image on the display element 10.

In step S202, it is determined whether the camera 1 is powered off. If the camera 1 is powered off (Yes in step S202), the flow ends. If the camera 1 is not powered off (No in step S202), the processing proceeds to step S203.

In step S203, the line-of-sight detection operation is performed. In step S203, operations similar to those of steps S102 to S109 in the calibration operation described with reference to the flowchart in FIG. 6 are performed. Also, in the line-of-sight detection operation when the image is captured, the rotation angles θx and θy of the eyeball 14 are calculated from the pupil center calculated by excluding the upper portion of the pupil contour obtained by the eyeball image sensor 17.

In step S204, the rotation angles θx and θy of the eyeball 14 detected by the operation of step S203 are corrected. The rotation angles θx and θy and the corrected values θx_cal and θy_cal stored in the memory unit 4 in step S110 are read, and the coordinate values Hx and Hy are calculated and set as a point-of-gaze position.

In step S205, an AF frame is displayed at the point-of-gaze position on the display element 10.

In step S206, it is determined whether the switch SW1 is turned on by the photographer pressing the shutter release button. If the switch SW1 is turned on (Yes in step S206), the processing proceeds to step S207. If the switch SW1 is not turned on (No in step S206), the processing returns to step S201. In step S201, the display of the image and the line-of-sight detection operation are repeated.

In step S207, an AF operation is performed.

The image sensor 2 includes a plurality of pixels used for phase difference detection. By image plane phase difference AF, which is a known technique, the CPU 3 calculates the focus state of an object corresponding to the AF frame determined in step S205 from signals of the plurality of pixels and controls and adjusts the positions of the lenses 101 and 102.

In step S208, it is determined whether the shutter release button is further pushed in and the switch SW2 is turned on. If the switch SW2 is turned on (Yes in step S208), the processing proceeds to step S209. If the switch SW2 is not turned on (No in step S208), the processing returns to step S206. In step S206, the AF operation is performed again at the same position.

In step S209, the image sensor 2 is driven, the image is acquired, and the image is recorded in a recording medium (not illustrated). Then, the processing returns to the operation of step S201.

As described above, by the operations of steps S106 and S107 in FIG. 6, the coordinates in the upper portion of the contour likely to be lost due to the eyelid are excluded, and then, true circular approximation calculation is performed (steps S106 and S107).

If the pupil is elliptical, the exclusion of the upper portion of the contour results in shifting the center coordinates. In response, the same exclusion process is performed both when the calibration operation is performed and when the image capturing operation is performed, whereby it is possible to cancel out the influence of the exclusion.

In the first embodiment, a description has been given of a method for assuming a range where contour coordinates are lost under the influence of the eyelid, and always excluding contour information regarding this range. In a second embodiment, a description is given of a method for dynamically switching a loss range.

The configurations of a camera and a line-of-sight detection device according to the second embodiment of the present invention are similar to those in FIG. 1 to FIGS. 4A and 4B in the first embodiment, and therefore are not described here.

<Line-of-Sight Detection Operation when Calibration is Performed>

Figure 8:
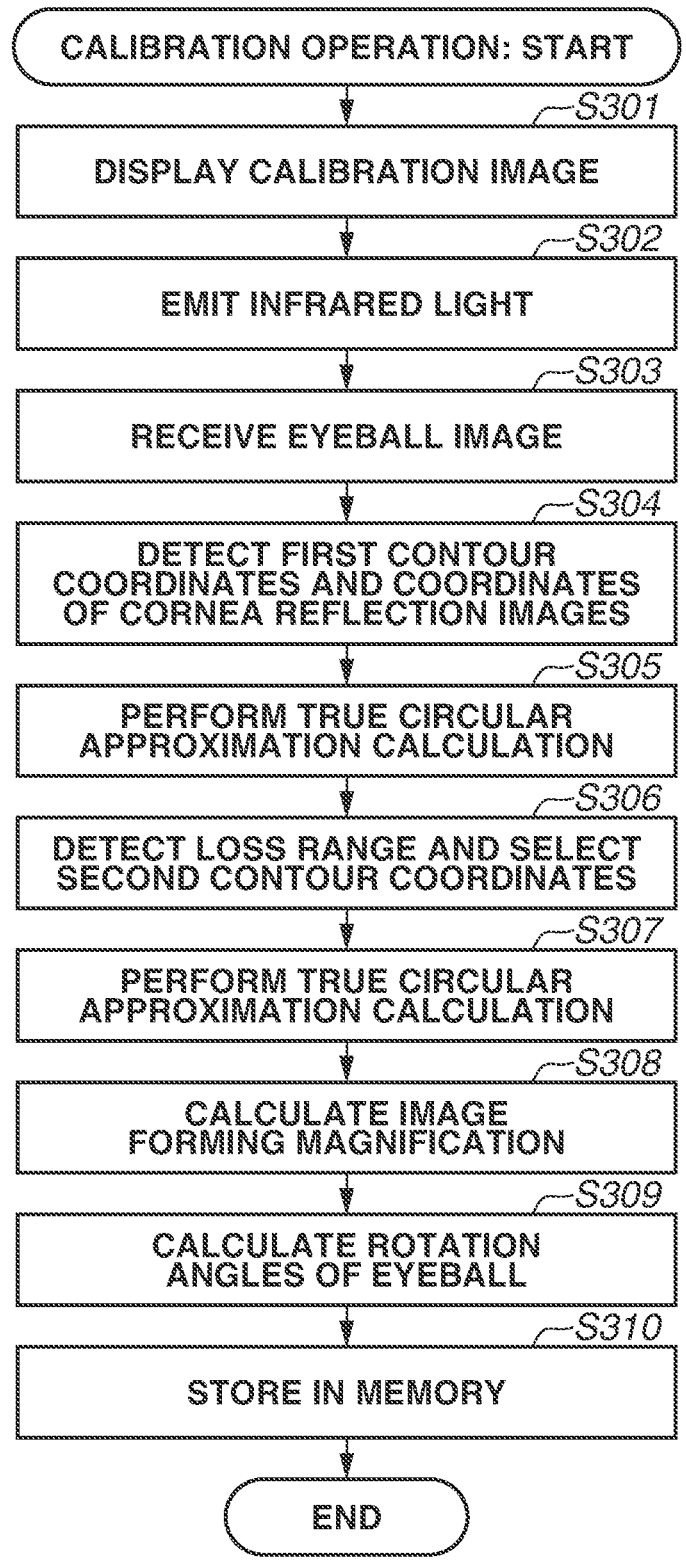
FIG. 8 is a flowchart of a calibration operation for line-of-sight detection according to a second embodiment of the present invention.

FIG. 8 is a flowchart illustrating a calibration operation for line-of-sight detection. The operation of the flowchart is executed by control of the CPU 3.

The operations of steps S301 to S305 are similar to those of steps S101 to S105 in FIG. 6, and therefore are not described.

In step S306, a loss range is detected from "the first contour coordinates" and "the center coordinates c and the radius r calculated from the first contour coordinates", and second contour coordinates are selected.

Figure 9:
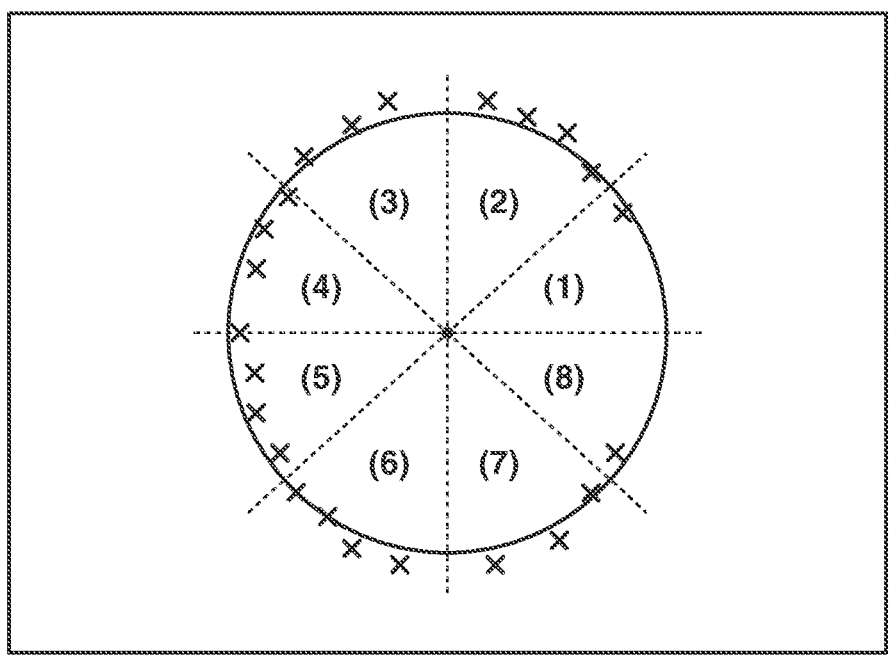
FIG. 9 is a diagram illustrating a determination of loss of contour information according to the second embodiment of the present invention.

FIG. 9 is a diagram illustrating an example of the selection range of contour coordinates according to the second embodiment.

A circle formed by "the first contour coordinates" and "the center coordinates c and the radius r calculated from the first contour coordinates" are divided into eight fan-like regions (1) to (8). With respect to each of the regions (1) to (8), the number of pairs of contour coordinates is counted. A region where it is determined that the number of pairs of contour coordinates is less than or equal to a predetermined number is excluded from contour candidates. In this case, the regions (1) and (8) are exclusion targets, and coordinates present in the regions (2) to (7) are selected as the second contour coordinates.

In step S307, by the true circular approximation method, center coordinates c' and a radius r' of the pupil 141 are calculated from the second contour coordinates selected in step S306.

In step S308, the image forming magnification β of the eyeball image is calculated.

In step S309, the rotation angles θx and θy of the optical axis of the eyeball 14 are obtained.

In step S310, the rotation angles θx and θy calculated by the operation of step S309 are stored as the corrected values θx_cal and θy_cal in the memory unit 4. Information regarding the region determined in step S306 is also stored in the memory unit 4.

<Image Capturing Operation>

After the calibration operation for line-of-sight detection described in FIG. 8, an image capturing operation is performed. The image capturing operation is similar to that in the flowchart in FIG. 7, and therefore is not described.

As described above, a region where contour coordinates are lost is detected when the calibration is performed, the coordinates are excluded, and then, true circular approximation calculation is performed.

If the pupil is elliptical, the exclusion of the loss region determined when the calibration is performed results in shifting the center coordinates. In response, the exclusion process is performed on the same region both when the calibration operation is performed and when the image capturing operation is performed, whereby it is possible to cancel out the influence of the exclusion.

If the pupil contour cannot be normally detected under the influence of not only the eyelid but also outside light, not only the upper portion but also a left or right portion of the contour may be lost. Even in such a situation, it is possible to perform an excellent line-of-sight detection operation.

In a third embodiment, elliptical approximation is performed using a learned pupil shape, thereby reducing the influence of loss due to the eyelid on the detection accuracy of the line of sight.

It is known that the pupil shape varies from individual to individual, and there is a person whose pupil shape is not a true circle but an ellipse.

Figure 14A:
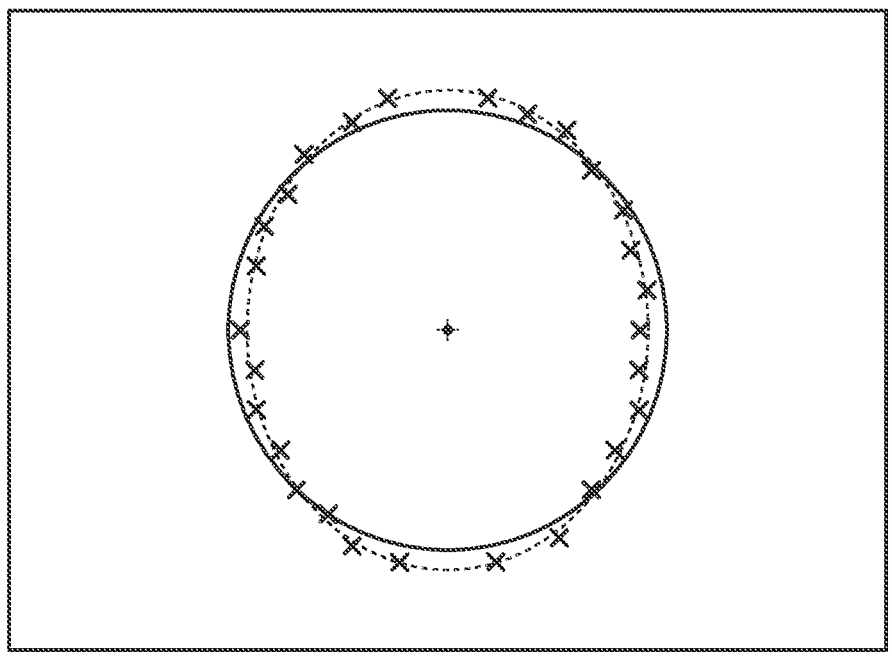
FIG. 14A is a diagram illustrating errors in circular approximation in a case where there is not a region where contour coordinates are lost.

FIG. 14A is a diagram illustrating the center coordinates of an elliptical pupil shape detected from information regarding the pupil edge by true circular approximation. A dotted line and a "•" mark indicate the actual pupil contour and the center coordinates of the actual pupil contour, and "x" marks indicate the coordinates of the pupil contour determined based on output signals of an area sensor. A solid line and a "+" mark indicate an approximate circle obtained by true circular approximation calculation based on the coordinates of the pupil contour and the center coordinates of the approximate circle. In FIG. 14A, contour information is present above, below, and to the left and right of the pupil center. Thus, although the pupil shape is actually an ellipse, the "•" mark and the "+" mark almost match each other by performing true circular approximation calculation using the method of least squares.

Figure 14B:
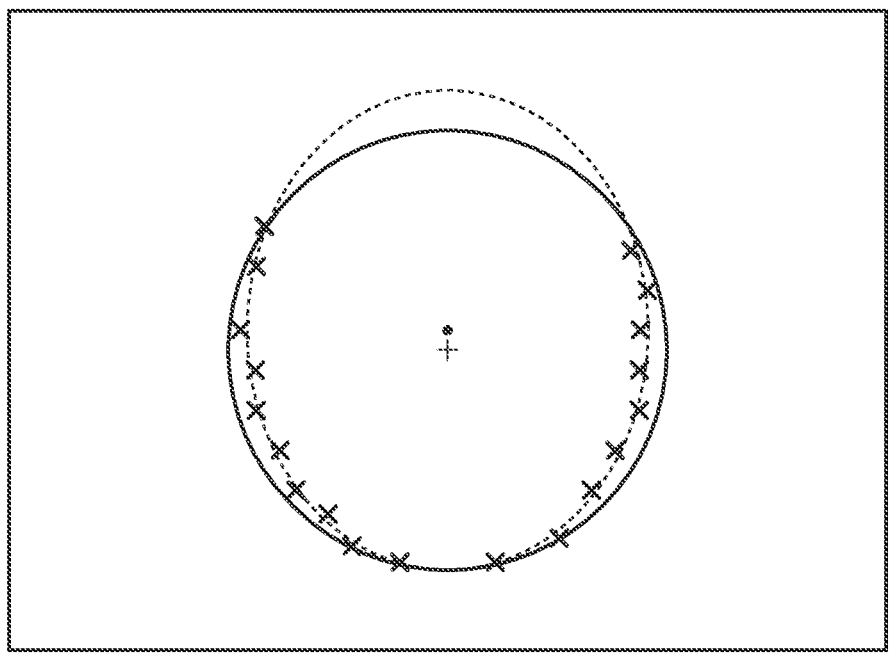
FIG. 14B is a diagram illustrating errors in circular approximation in a case where there is a region where contour coordinates are lost.

On the other hand, FIG. 14B illustrates the state where an elliptical pupil shape is detected similarly to that in FIG. 14A, but a part of the contour is lost, and only the coordinates of the lower half of the contour are present. In fact, the upper side of the pupil is often lost under the influence of the eyelid.

As described above, if true circular approximation calculation is performed on only the coordinates of the contour edge in the lower half of a vertically long ellipse, the center of gravity is offset in a downward direction from the actual pupil center.

In response, in the present embodiment, as described above, elliptical approximation is performed using a learned pupil shape, thereby reducing the influence of loss due to the eyelid on the detection accuracy of the line of sight.

The configurations of a camera and a line-of-sight detection device according to the third embodiment are similar to those in FIG. 1 to FIGS. 4A and 4B in the first embodiment, and therefore are not described here.

<Identification of Pupil Center Position by Elliptical Approximation>

Next, elliptical approximation is described.

The general formula for an ellipse is represented as follows.

$$\left(\frac{(Xi-X0)\cos\theta + (Yi-Y0)\sin\theta}{a}\right)^2 + \left(\frac{-(Xi-X0)\sin\theta + (Yi-Y0)\cos\theta}{b}\right)^2 = 1$$

X0, Y0: the center coordinates of the ellipse

θ: the inclination of the ellipse a: the length in an X-axis direction of the ellipse b: the length in a Y-axis direction of the ellipse The expansion of the above formula and the replacement of unknowns by variables can be represented as follows.

$$\Sigma(Xi^2 + A*Yi^2 + B*Xi + C*Yi + D)^2 = 0 \quad \text{formula (1)}$$

The partial differentiation of A to E can be represented by the following matrix.

$$\begin{pmatrix} A \\ B \\ C \\ D \\ E \end{pmatrix} =$$

$$\begin{pmatrix} \sum Xi^2Yi^2 & \sum XiYi^3 & \sum Xi^2Yi & \sum XiYi^2 & \sum XiYi \\ \sum XiYi^3 & \sum Yi^4 & \sum XiYi^2 & \sum Yi^3 & \sum Yi^2 \\ \sum Xi^2Yi & \sum XiYi^2 & \sum Xi^2 & \sum XiYi & \sum Xi \\ \sum XiYi^2 & \sum Yi^3 & \sum XiYi & \sum Yi^2 & \sum Yi \\ \sum XiYi & \sum Yi^2 & \sum Xi & \sum Yi & \sum 1 \end{pmatrix}^{-1} \begin{pmatrix} -\sum Xi^3Yi \\ -\sum Xi^2Yi^2 \\ -\sum Xi^3 \\ -\sum Xi^2Yi \\ -\sum Xi^2 \end{pmatrix}$$

Based on A to E, the ellipse parameters are obtained by the following formulas.

$$X0 = \frac{AD - 2BC}{4B - A^2}$$

$$Y0 = \frac{AC - 2D}{4B - A^2}$$

$$\theta = \frac{\tan^{-1}\left(\frac{A}{1-B}\right)}{2}$$

$$a = \sqrt{\left(\frac{X0\cos\theta +}{Y0\sin\theta}\right)^{-1} - E\cos^2\theta - \left\{\left(\frac{X0\sin\theta -}{Y0\cos\theta}\right)^2 - E\sin^2\theta\right\}\frac{\sin^2\theta - B\cos^2\theta}{\cos^2\theta - B\sin^2\theta}}$$

$$b = \sqrt{\left(\frac{X0\sin\theta -}{Y0\cos\theta}\right)^{-1} - E\sin^2\theta - \left\{\left(\frac{X0\cos\theta +}{Y0\sin\theta}\right)^2 - E\sin^2\theta\right\}\frac{\cos^2\theta - B\sin^2\theta}{\sin^2\theta - B\cos^2\theta}}$$

If the photographer does not look into the digital still camera 1 with the eyeball 14 inclined with respect to the digital still camera 1, i.e., if θ=0, the above formula is transformed as follows.

$$\begin{pmatrix} A \\ B \\ C \\ D \end{pmatrix} = \quad \text{formula (2-1)}$$

$$\begin{pmatrix} \sum Yi^4 & \sum XiYi^2 & \sum Yi^3 & \sum Yi^2 \\ \sum XiYi^2 & \sum Xi^2 & \sum XiYi & \sum Xi \\ \sum Yi^3 & \sum XiYi & \sum Yi^2 & \sum Yi \\ \sum Yi^2 & \sum Xi & \sum Yi & \sum 1 \end{pmatrix}^{-1} \begin{pmatrix} -\sum Xi^2Yi^2 \\ -\sum Xi^3 \\ -\sum Xi^2Yi \\ -\sum Xi^2 \end{pmatrix}$$

$$A = \left(\frac{a}{b}\right)^2$$

$$B = -2*X0$$

$$C = -2*\left(\frac{a}{b}\right)*Y0$$

$$D = X0^2 + \left(\frac{a}{b}\right) + Y0^2 - a^2$$

Based on A to D, the ellipse parameters are obtained by the following formulas.

$$X0 = \frac{B}{-2} \quad \text{formula (2-2)}$$

$$Y0 = \frac{C}{-2*A} \quad \text{formula (2-3)}$$

$$a = \sqrt{X0^2 + A*Y0^2 - D} \quad \text{formula (2-4)}$$

$$b = \frac{a}{\sqrt{A}} \quad \text{formula (2-5)}$$

$$u = \frac{a}{b} \quad \text{formula (2-6)}$$

It is understood that A is a value equivalent to a flattening (a/b) of the ellipse.

Further, to make it likely to obtain a stored flattening u of the ellipse=a/b by adding a normalization term to the least squares in formula (1), formula (1) is transformed as follows.

$$\Sigma(Xi^2 + A*Yi^2 + B*Xi + C*Yi + D)^2 + \lambda*(A - u^2)^2 = 0$$

u: the stored flattening (a/b)

λ: the degree of influence of the normalization term

A: the flattening $(a/b)^2$ of the ellipse

If the above formula is transformed by partial differentiation, $$\begin{pmatrix} A \\ B \\ C \\ D \end{pmatrix} = \begin{pmatrix} \sum Yi^4 + \lambda & \sum XiYi^2 & \sum Yi^3 & \sum Yi^2 \\ \sum XiYi^2 & \sum Xi^2 & \sum XiYi & \sum Xi \\ \sum Yi^3 & \sum XiYi & \sum Yi^2 & \sum Yi \\ \sum Yi^2 & \sum Xi & \sum Yi & \sum 1 \end{pmatrix}^{-1} \quad \text{formula (3-1)}$$

$$\begin{pmatrix} -\sum Xi^2Yi^2 + \lambda*u^2 \\ -\sum Xi^3 \\ -\sum Xi^2Yi \\ -\sum Xi^2 \end{pmatrix}$$

A to D are calculated by the above formula of the method of least squares, and based on the calculation results, the ellipse parameters are obtained by the following formulas.

$$X0 = \frac{B}{-2} \quad \text{formula (3-2)}$$

$$Y0 = \frac{C}{-2*A} \quad \text{formula (3-3)}$$

$$a = \sqrt{X0^2 + A*Y0^2 - D} \quad \text{formula (3-4)}$$

$$b = \frac{a}{\sqrt{A}} \quad \text{formula (3-5)}$$

$$u = \frac{a}{b} \quad \text{formula (3-6)}$$

Using the above calculation formulas, it is possible to reduce an error in the center coordinates based on the presence or absence of loss of contour information due to the eyelid.

Next, a flowchart using the above calculation formulas is described.

<Line-of-Sight Detection Operation when Calibration is Performed>

Figure 10:
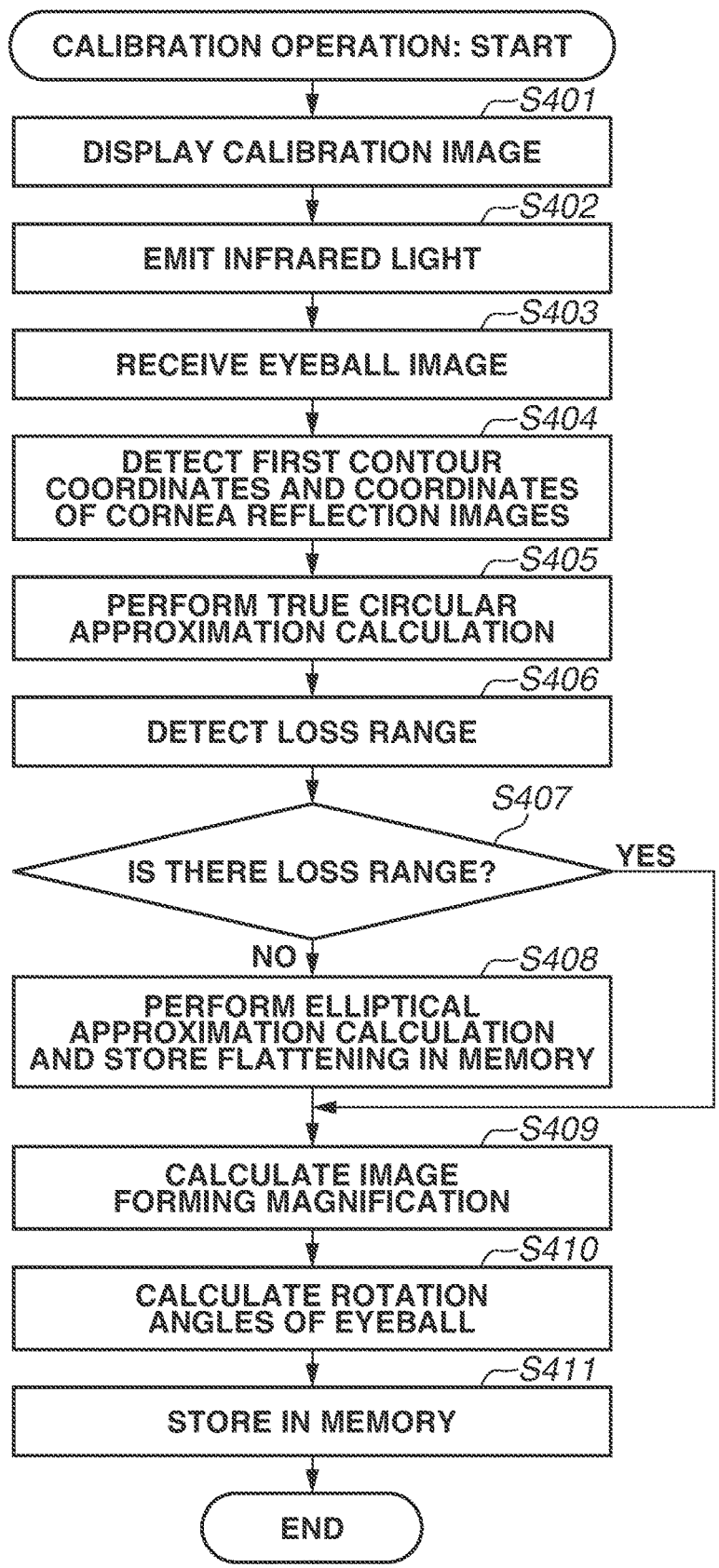
FIG. 10 is a flowchart of a calibration operation for line-of-sight detection according to a third embodiment of the present invention.

FIG. 10 is a flowchart illustrating a calibration operation for line-of-sight detection including the learning of an elliptical shape. The operation of this flowchart is executed by control of the CPU 3.

The operations of steps S401 to S405 are similar to those of steps S301 to S305 in FIG. 8, and therefore are not described.

In step S406, similarly to step S306 in FIG. 8, a loss range is detected from "the first contour coordinates" and "the center coordinates c and the radius r calculated from the first contour coordinates".

Similarly to the second embodiment, with respect to each of the regions (1) to (8) in FIG. 9, the number of pairs of contour coordinates is counted. If there is a region where it is determined that the number of pairs of contour coordinates is less than or equal to a predetermined number, it is determined that there is a loss range.

In step S407, if it is determined that there is not a loss range (No in step S407), then in step S408, a center c' and the flattening u of the ellipse are calculated by formulas (2-1) to (2-6). The flattening u is stored in the memory unit 4.

In step S409, similarly to step S308, the image forming magnification β of the eyeball image is calculated.

In step S410, similarly to step S309, the rotation angles θx and θy of the optical axis of the eyeball 14 are obtained. If there is not a loss range, the center c' of the pupil 141 calculated by elliptical approximation in step S407 is used. If there is a loss range, the center c of the pupil 141 calculated by true circular approximation in step S405 is used.

In step S411, similarly to step S310, the calculated rotation angles θx and θy are stored as the corrected values θx_cal and θy_cal in the memory unit 4.

<Image Capturing Operation>

After the calibration operation for line-of-sight detection described in FIG. 10, an image capturing operation is performed.

The image capturing operation is also similar to that in the flowchart in FIG. 7 except for the process of step S203, and therefore is not described.

<Line-of-Sight Detection>

Figure 11:
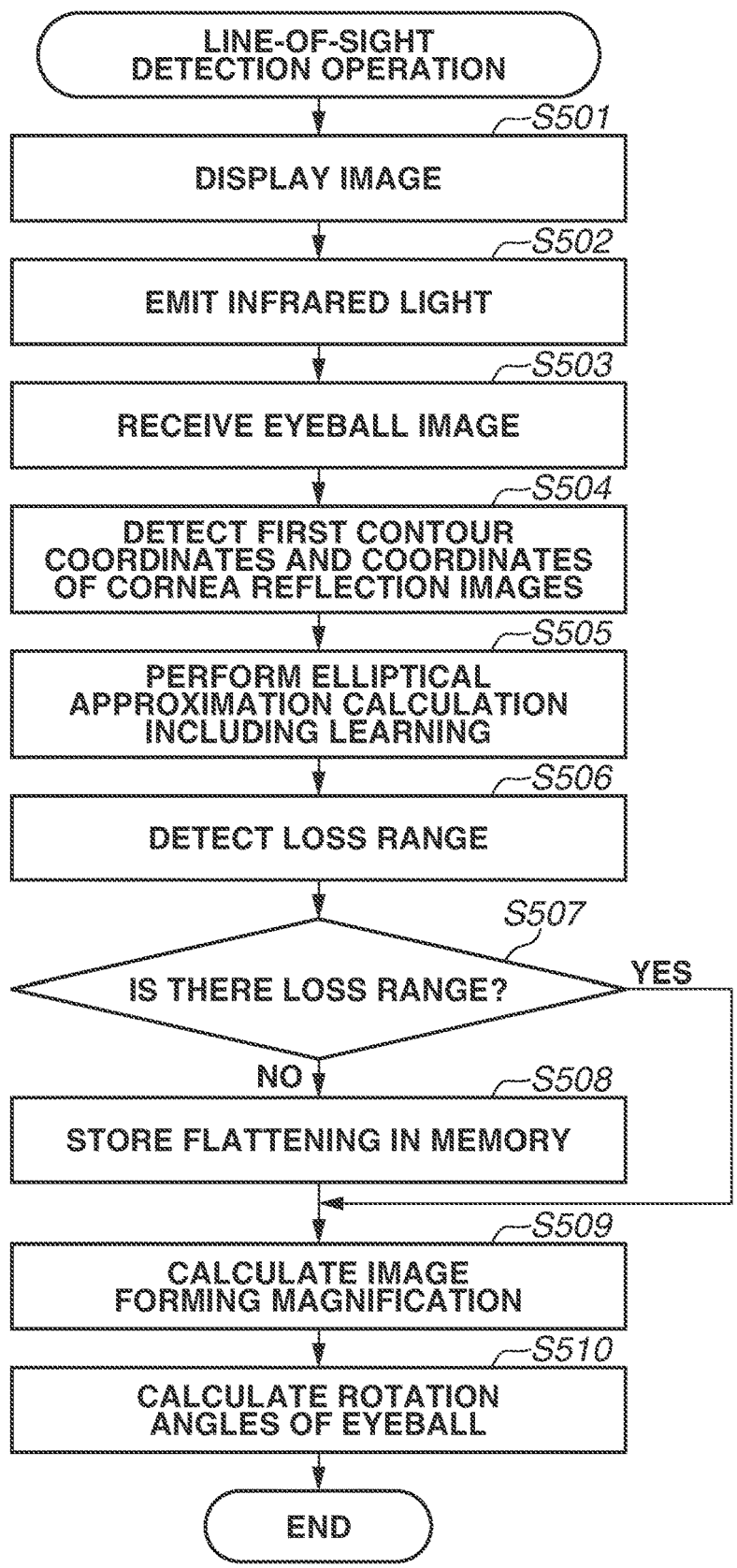
FIG. 11 is a flowchart of a line-of-sight detection operation according to the third embodiment of the present invention.

FIG. 11 is a flowchart of the line-of-sight detection operation in step S203 in FIG. 7. The operation of this flowchart is executed by control of the CPU 3.

The operations of steps S501 to S504 are similar to those of steps S301 to S304 in FIG. 8, and therefore are not described.

In step S505, by the elliptical approximation method using formulas (3-1) to (3-6), center coordinates c' and a flattening u' of the pupil 141 are calculated using the flattening u held in the memory unit 4 and the contour coordinates of the pupil 141 obtained by the operation of step S504 as the first contour coordinates.

In step S506, similarly to step S306 in FIG. 8, a loss range is detected from "the first contour coordinates" and "the center coordinates c' and the length in the X-axis direction/the length in the Y-axis direction of the ellipse calculated from the first contour coordinates".

With respect to each of the regions (1) to (8) in FIG. 9, the number of pairs of contour coordinates is counted. If there is a region where it is determined that the number of pairs of contour coordinates is less than or equal to a predetermined number, it is determined that there is a loss range.

In step S507, if it is determined that there is not a loss range (No in step S507), then in step S508, the value of the weighted average of the flattening u stored in the memory unit 4 and the flattening u' calculated in step S505 is calculated, and the flattening u stored in the memory unit 4 is updated.

The flattening of the pupil 141 changes between when the photographer looks straight ahead and when the photographer looks up, down, left, and right by rotating the pupil 141. Thus, the positions where the pupil position is present relative to the edge of the eyelid may be detected, and the flattening u at each position may be stored in the memory unit 4.

Further, the size of the diameter of the pupil 141 changes according to brightness. Thus, the flattening u may be stored in the memory unit 4 with respect to each size of the pupil diameter.

In step S509, similarly to step S308, the image forming magnification β of the eyeball image is calculated.

In step S510, similarly to step S309, the rotation angles θx and θy of the optical axis of the eyeball 14 are obtained. In this case, the center c' of the pupil 141 calculated by elliptical approximation in step S505 is used.

As described above, the shape of the pupil 141 is repeatedly learned, and elliptical approximation using the learning results is performed, whereby it is possible to reduce the influence of loss.

In a fourth embodiment, true circular approximation and elliptical approximation are switched according to the degree of loss of the pupil contour, thereby reducing the influence of loss due to the eyelid on the detection accuracy of the line of sight.

As described above, it is known that the pupil shape varies from individual to individual, and there is a person whose pupil shape is not a true circle but an ellipse. In either pupil shape, if there is not loss, the center coordinates of the pupil 141 can be obtained by performing elliptical approximation calculation using the method of least squares.

If, however, a part of the contour is lost as illustrated in FIG. 14B, the degree of freedom of elliptical approximation calculation is so high that the calculated ellipse can be vertically long or horizontally long. As a result, the results of the center coordinates may be far more incorrect than in true circular approximation.

In response, the presence or absence of a defect in the contour is determined, and true circular approximation and elliptical approximation are appropriately switched, thereby reducing an error in line-of-sight detection.

The configurations of a camera and a line-of-sight detection device according to the fourth embodiment of the present invention are similar to those in FIG. 1 to FIGS. 4A and 4B in the first embodiment, and therefore are not described here.

Next, a flowchart using the above calculation formulas is described.

<Line-of-Sight Detection Operation when Calibration is Performed>

Figure 12:
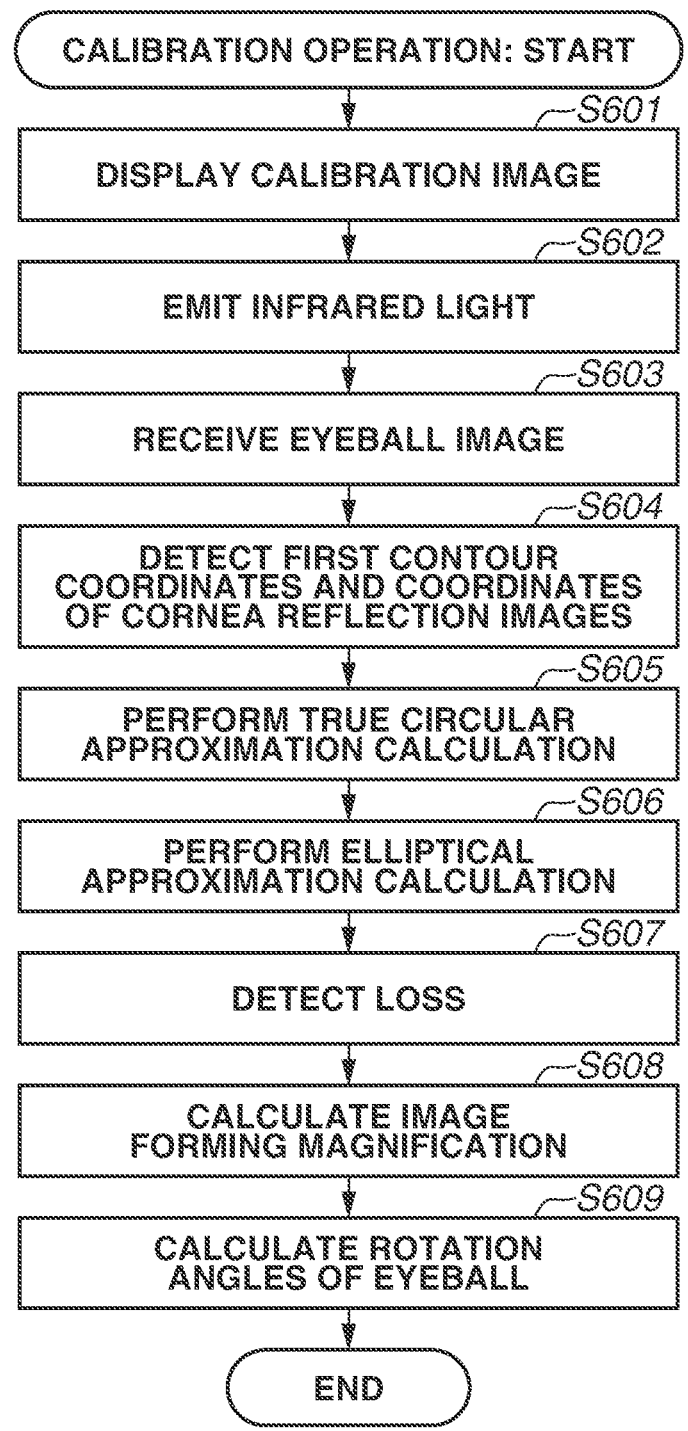
FIG. 12 is a flowchart of a calibration operation for line-of-sight detection according to a fourth embodiment of the present invention.

FIG. 12 is a flowchart illustrating a calibration operation for line-of-sight detection.

The operation of this flowchart is executed by control of the CPU 3.

The operations of steps S601 to S605 are similar to those of step S301 to S305 in FIG. 8, and therefore are not described.

In step S606, a center c' of the ellipse is calculated by formulas (2-1) to (2-5).

In step S607, the presence or absence of loss is detected from "the first contour coordinates" and "the center coordinates c' and the radius r calculated from the first contour coordinates".

Figure 13:
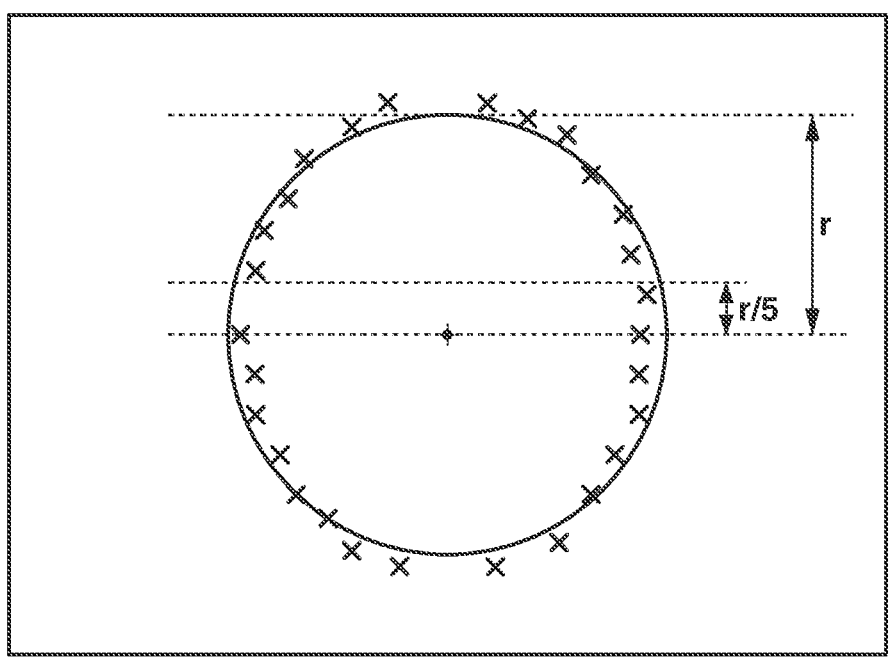
FIG. 13 is a diagram illustrating a determination of loss of contour information according to the fourth embodiment of the present invention.

FIG. 13 is a diagram illustrating an example of the detection of the presence or absence of loss.

The number of pairs of first contour coordinates in a portion above r/5 in the up direction of the Y-axis from the center coordinates is counted. If the counted number is greater than or equal to a predetermined number, it is determined that there is not loss in the up direction of the Y-axis. Similarly, it is determined whether there is loss in the down direction of the Y-axis and the left and right directions of the X-axis. If there is not loss in any or all of the four directions, it is determined that there is not loss. That is, a threshold is set for any or all of the up, down, left, and right directions, and loss of the contour is determined.

The size of the pupil 141 changes according to brightness. Thus, the threshold for the counted number may be changed according to the size r of the pupil 141.

In step S608, similarly to step S308, the image forming magnification β of the eyeball image is calculated.

In step S609, similarly to step S309, the rotation angles θx and θy of the optical axis of the eyeball 14 are obtained. If there is not a loss range, the center c' of the pupil 141 calculated by elliptical approximation in step S606 is used. If there is a loss range, the center c of the pupil 141 calculated by true circular approximation in step S605 is used.

<Description of Image Capturing Operation>

After the calibration operation for line-of-sight detection described in FIG. 12, an image capturing operation is performed.

The image capturing operation is similar to that in the flowchart in FIG. 7 except for the process of step S203 in FIG. 7, and therefore is not described.

In step S203, operations similar to those of steps S602 to S609 in the calibration operation described with reference to the flowchart in FIG. 12 are performed. Also, in the line-of-sight detection operation when the image is captured, true circular approximation and elliptical approximation are switched according to the degree of loss of the pupil contour.

As described above, the presence or absence of loss is detected, and true circular approximation and elliptical approximation are switched according to the detection result, whereby it is possible to reduce the influence of loss.

If true circular approximation and elliptical approximation are frequently switched, the results vary. Thus, hysteresis for making it less likely to switch true circular approximation and elliptical approximation may be provided. For example, a threshold r/5 and a threshold for the counted number may be provided according to the result of the previous determination of the presence or absence of loss. Alternatively, if the same result of the determination of the presence or absence of loss continues a predetermined number of times or more, the approximation method may be switched.

Further, in a case where it is determined that true circular approximation is to be performed on an elliptical pupil when the calibration is performed, and if elliptical approximation is performed when the image capturing operation is performed, the center coordinates shift. Thus, if there is a defect when the calibration is performed, it may be determined that true circular approximation is to be performed also when the image capturing operation is performed.

Other Embodiments

The CPU 3 may control the display element 10 to display an indicator indicating a gaze position corresponding to a line of sight detected as the result of performing line-of-sight detection in the above embodiments.

In the operations described with reference to the flowcharts in the above embodiments, the order of steps to be executed can be appropriately changed so that a similar purpose can be achieved.

An apparatus to which the present embodiments are applied is not limited to the camera illustrated in the present embodiments so long as the apparatus has a line-of-sight detection function. For example, the present embodiments may be applied to a head-mounted display.

While embodiments of the present invention have been described above, the present invention is not limited to these embodiments, and can be modified and changed in various ways within the scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. The scope of the following claims is to be accorded the broadest interpretation so as to encompass all such modifications and equivalent structures and functions.

This application claims the benefit of Japanese Patent Application No. 2021-030209, filed Feb. 26, 2021, which is hereby incorporated by reference herein in its entirety.

What is claimed is:

1. A detection device comprising:
an image capturing circuit; and
at least one processor that causes the detection device to function as:
a coordinate detection unit that detects coordinates of pupil contour positions in an image of an eyeball of an observer captured by the image capturing circuit; and
a gaze position detection unit configured to calculate a pupil center position on a basis of the coordinates of pupil contour positions, and to detect a gaze position of the observer using the pupil center position;
wherein, where a number of the coordinates of pupil contour positions detected by the coordinate detection unit is smaller than a predetermined number, the gaze position detection unit detects the gaze position of the observer using a pupil center position calculated by approximating the contour of a pupil to a first circle, and
wherein, where the number of the coordinates of pupil contour positions detected by the coordinate detection unit is equal to or greater than the predetermined number, the gaze position detection unit detects the gaze position of the observer using a pupil center position calculated by approximating the contour of the pupil to a second circle that is more flattened than the first circle,
wherein the gaze position detection unit counts the number of the coordinates of pupil contour positions in a predetermined direction from the pupil center position calculated by approximating the contour of the pupil to the first circle, and determine the pupil center position on a basis of the counted number of the coordinates of pupil contour positions.

2. The detection device according to claim 1, wherein the gaze position detection unit counts the number of coordinates of pupil contour positions in the predetermined direction on a basis of the pupil center position calculated by approximating the contour of the pupil to the first circle and on a basis of size of the pupil.

3. The detection device according to claim 1, wherein the first circle is a true circle, and the second circle is an ellipse.

4. A control method for controlling a detection device, the control method comprising:
capturing an image of an eyeball of an observer;
detecting coordinates of pupil contour positions in an image of an eyeball of an observer captured by the image capturing circuit; and
calculating a pupil center position on a basis of the coordinates of pupil contour positions, and detecting a gaze position of the observer using the pupil center position;
wherein, where a number of the coordinates of pupil contour positions detected is smaller than a predetermined number, the gaze position of the observer using a pupil center position calculated by approximating the contour of a pupil to a first circle is detected, and
wherein, where the number of the coordinates of pupil contour positions detected is equal to or greater than the predetermined number, the gaze position of the observer using a pupil center position calculated by approximating the contour of the pupil to a second circle that is more flattened than the first circle is detected,
wherein the gaze position detection unit counts the number of the coordinates of pupil contour positions in a predetermined direction from the pupil center position calculated by approximating the contour of the pupil to the first circle, and determine the pupil center position on a basis of the counted number of the coordinates of pupil contour positions.

* * * * *